United States Patent [19]

Gaussa et al.

[11] Patent Number: 4,922,194
[45] Date of Patent: May 1, 1990

[54] PROCESS SENSOR SIMULATORS

[75] Inventors: William P. Gaussa, Monroeville;
David G. Theriault, Plum Borough;
William W. Wassel, Murrysville;
John A. Skoncey, Delmont; Ronald
R. Havelka, West Mifflin, all of Pa.

[73] Assignee: Westinghouse Electric Corp.,
Pittsburgh, Pa.

[21] Appl. No.: 330,545

[22] Filed: Mar. 30, 1989

[51] Int. Cl.$^5$ ............................................. G01R 19/03
[52] U.S. Cl. ................................. 324/158 R; 364/806
[58] Field of Search ............ 324/158 R, 73 R, 73 AT;
364/801, 802, 806

[56] References Cited

U.S. PATENT DOCUMENTS 3,947,675  3/1976  Mayn ..................................... 364/802
4,044,600  8/1977  Claxton et al. ....................... 364/806

Primary Examiner—Reinhard J. Eisenzopf
Assistant Examiner—Edward Urban
Attorney, Agent, or Firm—D. C. Abeles

[57]     ABSTRACT

A circuit device for simulating a selected one of a plurality of process transducers, including: signal input and output terminals connectable to external conductors; a plurality of circuit components (90,92,94; 104,108) connectable between the signal input and output terminals; a coupling device (106) connected between two of the circuit components for conducting a signal between the two components; and selective connecting members including connector terminals connected to at least one of the circuit components (90,92,94; 104,108), and connector elements for establishing conductive connections between selected ones of the connector terminals for configuring the circuit device to apply to the signal output terminal a signal corresponding to the output signal of a selected transducer.

18 Claims, 3 Drawing Sheets

PROCESS SENSOR SIMULATORS

BACKGROUND OF THE INVENTION

The present invention is directed to transducer, or sensor, simulators primarily for use in testing process monitoring systems.

Many types of monitoring installations are composed of one or more condition transducers, or sensors, and a system for monitoring the transducer output to provide desired information. There is frequently a need to test such a monitoring system with the transducers removed but based on the input signals which would be applied to the transducers during normal operation of the installation.

In more general terms, there are many testing procedures which require, or would be aided by, components which can be adapted to simulate a variety of transducers. For example, there is a need for components which can simulate current transmitters, devices, such as thermocouples, which produce a voltage signal, and resistance temperature detectors.

It is common practice to simulate field mounted resistance temperature detectors (RTDs) by potentiometers. This requires human interaction with the test equipment, thereby constituting an obstacle to automation of the testing process.

SUMMARY OF THE INVENTION

It is an object of the present invention to provide board mounted resistance temperature detector simulators which are easily adjustable as to the temperature response range and nominal resistance to be simulated.

Another object of the invention is to provide board mounted circuits which can be set to simulate sensors producing a current or voltage output, including thermocouples, having selected characteristics.

The above and other objects are achieved, according to the present invention, by a circuit device for simulating a selected one of a plurality of process transducers, comprising: means defining signal input and output terminals connectable to external conductors; means defining a plurality of circuit components connectable between the signal input and output terminals; coupling means connected between two of the circuit components for conducting a signal between the two components; and selective connecting means including connector terminals connected to at least one of the circuit components, and connector elements for establishing conductive connections between selected ones of the connector terminals for configuring the circuit device to apply to the signal output terminal a signal corresponding to the output signal of a selected transducer.

Objects according to the invention are further achieved by a testing system comprising: a plurality of devices each as defined above; a circuit carrying all of the connector elements; control means connected for controlling the conductive connections established by the connector elements between selected ones of the connector terminals; and personal computer means connected to the signal input terminals of all of the devices for supplying input signals thereto and to the control means for supplying control signals designating the conductive connections which are to be established by the control means.

DESCRIPTION OF THE PREFERRED EMBODIMENTS

The invention essentially relates to board-mounted interface circuits which serve to simulate a variety of field sensors such as those employed in a nuclear power plant. These circuits are useful for testing components or systems which, during normal operation, receive signals produced by such sensors.

A simulator circuit according to the invention is generally composed of a plurality of parallel, structurally identical, channels each composed of a set of analog circuit devices. Each channel further includes jumper terminals which can be selectively connected to create a simulation of a particular type of sensor, or transducer. Thus, the circuit can easily be configured to simulate any desired group of sensors and the configurations can easily be altered as needed for different applications.

Board-mounted circuits according to the invention can be employed in test fixtures for nuclear plant process instrumentation, card and burn-in test fixtures, training simulator fixtures and field diagnostic test equipment.

Figure 1:
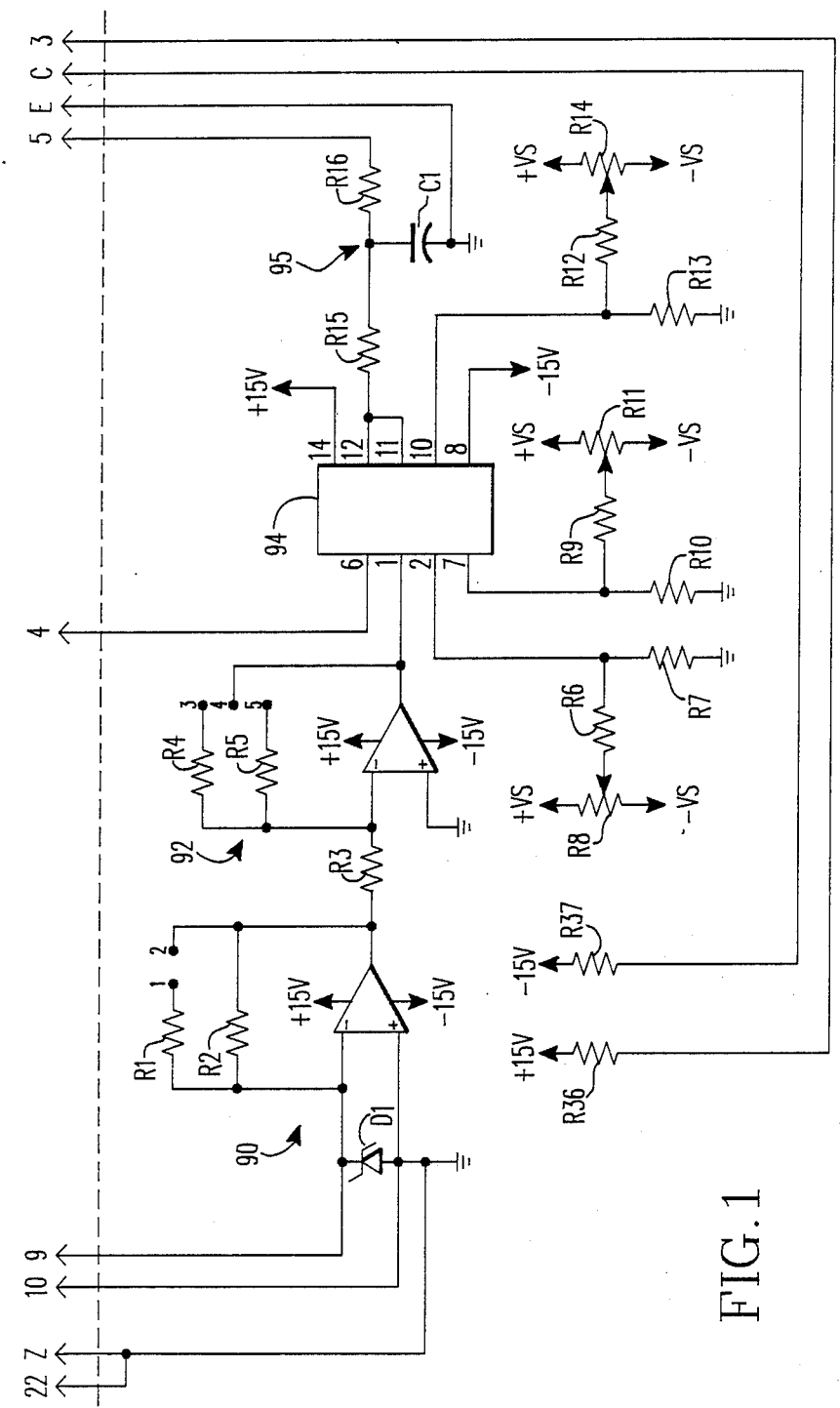
FIG. 1 is a circuit diagram of a preferred embodiment of a first type of simulator according to the invention.

FIG. 1 shows one preferred embodiment of a resistance temperature detector (RTD) simulator according to the invention. The terminals represented by arrows are connected to external plug-in contacts along one edge of the circuit board, while the terminals represented by small hollow circles are jumper contacts which may be connected together by appropriate shorting bars or relays mounted on a separate board. A first amplifier circuit 90 includes an operational amplifier (U1) connected as a current-voltage converter having an input terminal (9) connected to receive the operating current that would be applied to the RTD. Amplifier circuit 90 has a resistive feedback path composed of a first resistor R2 permanently connected across the amplifier (U1) and a second resistor R1 provided with associated jumper contacts for selectively connecting resistor R1 in parallel with resistor R2. In the illustrated embodiment, when the jumper contacts associated with resistor R1 are open, an RTD having a base resistance of 200 Ω is simulated; when the jumper contacts are closed, the simulated RTD has a resistance of 100 Ω.

Amplifier circuit 90 is coupled to a second amplifier circuit 92 via a coupling resistor R3 for supplying the output signal from amplifier circuit 90 to the input of an operational amplifier (U2) of second amplifier circuit 92. Second amplifier circuit 92 has a resistive feedback path which can be switched between either one of two resistance values, represented by resistors R4 and R5, by the connection of a shorting bar between two associated jumper contacts. Amplifier circuit 92 serves to define the temperature responsive resistance variation range of the RTD being simulated, connection of resistor R4 being associated with a wide range and connection of resistor R5 being associated with a narrow range.

The output signal from amplifier circuit 92 is coupled via a conductor to one input of an analog multiplier 94, which can be constituted by an AD534 circuit. The other multiplier input is constituted by a voltage applied via external terminal 4, and the resulting product signal is applied to a proportional-integral (PI) network 95 between external terminals 5 and E.

The voltage applied via external terminal 4 relates to the temperature value to be simulated and may be derived from a computer controllable voltage source or the wiper of a potentiometer whose resistance is connected between terminals 3 and C.

The input and output voltage values associated with multiplier 94 may be calibrated by offset voltages supplied to multiplier 94 from associated potentiometers, as shown.

Thus, amplifier circuit 92 is configured to control the output range of the simulated RTD, while the voltage applied via external terminal 4 constitutes a demand voltage which determines the output signal level within the selected range. More precisely, the output voltage from amplifier circuit 92 is representative of the current flowing through the RTD being simulated and the voltage applied via external terminal 4 is representative of the resistance which the RTD would have at a given temperature.

Multiplier circuit 94 may be configured to produce an output voltage which is the product of the two input voltages divided by the maximum value of the voltage applied to external terminal 4. By using an external D/A converter board, the complete simulation process can be automated.

Other interface circuits according to the present invention are arranged to receive a potentiometer or other voltage type input and produce an output signal which can be configured to simulate the output of a thermocouple, a current transmitter, or a device producing an output voltage. These simulator circuits preferably include a test point in each channel which provides a voltage that is in accurate representation of the channel output signal and that can be measured without affecting the operation of the simulator circuit. One advantage of the circuits is that they do not require any adjustment controls. These circuits can selectively simulate either active or passive current transmitters, an active transmitter being one which has its own power supply and a passive transmitter being one which is supplied with power by the monitoring system.

Figure 2:
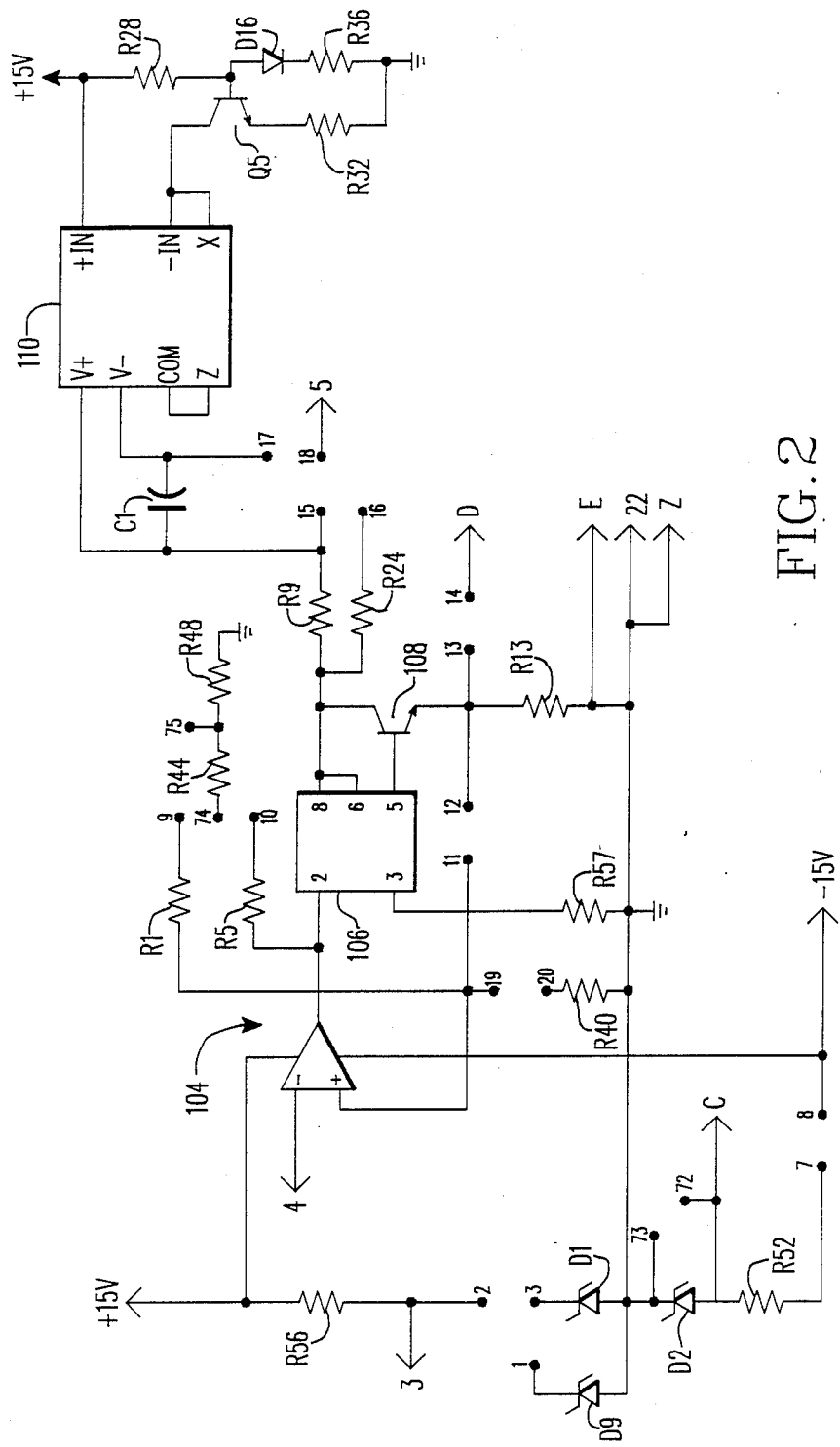
FIG. 2 is a circuit diagram of a preferred embodiment of a second type of simulator according to the invention.

One channel of such a simulation circuit is shown in FIG. 2. The analog circuit devices forming the channel include an input amplifier 104, an optical coupler 106, a current control transistor 108, a power supply 110 and a plurality of resistors and diodes.

Amplifier 104 is a differential amplifier having its inverting input connected via an input terminal 4 to the wiper of an external potentiometer (not shown). The potentiometer resistance is connected between terminals 3 and C. Such potentiometer connections can also be employed with respect to the correspondingly numbered external terminals of FIG. 1.

Coupler 106, which may be constituted by a 6N139 device, essentially includes an electro-optical input transducer, such as an LED, connected to the output of amplifier 104, an optoelectrical output transducer, such as a photodiode, and an optical fiber connected between the transducers. The purpose of coupler 106 is to electrically isolate the output of amplifier 104 from the circuit components downstream thereof.

The output transducer of coupler 106 is connected to the base of a transistor 108, in this embodiment an npn transistor, which is supplied with an operating voltage by power supply 110 so that transistor 108 conducts a current proportional to the voltage applied to its base. This current flows through a resistor R13, which is preferably a precision resistor, producing a voltage drop which is proportional to the current through transistor 108.

Power supply 110 is a dc/dc converter which receives operating power from an external source, shown connected to terminals +IN and −IN, and supplies regulated positive and negative output potentials at terminals V+ and V−.

An operative circuit arrangement is completed by connecting together selected sets of jumper contacts 1–3, 7–20 and 72–75 by means of shorting bars. The shorting bar connections to various simulation modes is shown in the following Table:

| Simulation mode | Jumper contacts to be shorted together |
| --- | --- |
| Current transmitter | |
| 4–20 ma active | 2–3; 11–12; 13–14; 17–18; 72–73 |
| 4–20 ma passive | 2–3; 11–12; 13–14; 15–18; 72–73 |
| 10–50 ma active | 1–2; 11–12; 13–14; 15–16; 17–18; 72–73 |
| 10–50 ma passive | 1–2; 11–12; 13–14; 15–16–18; 72–73 |
| Voltage generator, 0–10 V | 2–3; 7–8; 19–20; 9–10–14–18 |
| Thermocouple | 2–3; 7–8; 19–20; 9–10–74; 75–14–18 |

It will be seen that when a current transmitter is being simulated, the voltage across resistor R13 is fed back to the noninverting input of amplifier 104 so that the voltage drop across resistor R13 is essentially equal to the voltage at input terminal 4 and the current through transistor 108 is directly proportional to the voltage applied via terminal 4 to amplifier 104. When an active current transmitter is being simulated, the supply voltage, V+, V−, is connected in series between transistor and output terminal 5; for a passive current transmitter, the supply voltage is essentially removed from the circuit.

When a device producing a dc output voltage or a thermocouple is being simulated, coupler 106 and transistor 108 are effectively removed from the operating circuit. In all cases, the output signal appears at terminal 5 and the test point is constituted by terminal D. Zener diode D9 is selected to have a higher breakdown voltage than Zener diode D1.

While FIGS. 1 and 2 include exemplary component values, it will be appreciated that the invention is not limited to circuits having those component values.

Figure 3:
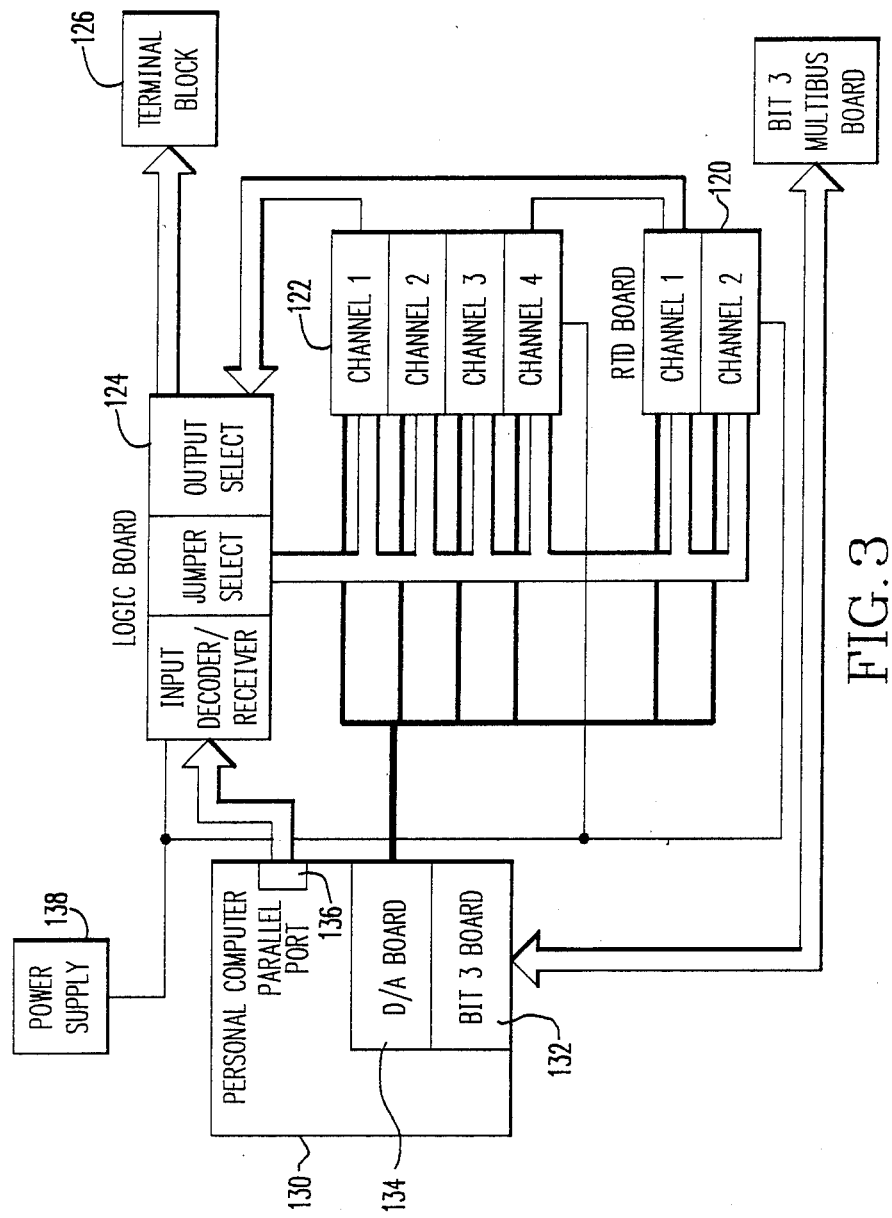
FIG. 3 is a pictorial block diagram of a testing system according to the invention employing a plurality of the circuits of FIGS. 1 and 2.

FIG. 3 illustrates, in block diagram form, a test system incorporating simulators of the type illustrated in FIGS. 1 and 2. The system includes an RTD board 120 containing two channels each having the form shown in FIG. 1 and a simulator board 122 containing four channels each having the form shown in FIG. 2. On boards 120 and 122, the jumper terminals illustrated in FIGS. 1 and 2 are brought to edge contacts which are connected, via a bus, to a jumper select unit mounted on a logic board 124. Typically, the jumper select unit is composed of a plurality of relays having their contacts connected, via the bus, to appropriate edge terminal contacts to establish the desired short circuits between appropriate sets of jumper terminals. Logic board 124 further includes an input decoder/receiver unit which controls the operation of the relays of the jumper select unit, as well as an output select unit which may also be composed of a plurality of relays controlled by the input decoder/receiver unit in order to connect the outputs of one or more of the channels on boards 120 and 122 to a terminal block 126 which is connected to the apparatus being tested.

The illustrated system further includes a personal computer 130 provided with an interface board 132 via which information, in digital form, relating to the input levels to be applied to the channels is supplied. This information is conducted to a digital/analog converter board 134 connected to supply suitable analog input signals to all of the channels on boards 120 and 122. Personal computer 130 further includes a parallel output port 136 connected via a bus to supply control signals to the input decoder/receiver unit on board 124. The system is completed by an appropriate power supply 138.

According to one mode of operation, each simulator channel can be configured to correspond to a respectively different type of sensor and the signals applied to logic board 124 can serve to connect the output of one of the channels to terminal block 126. However, it is also possible to connect the outputs of a plurality of channels to terminal block 126 and to vary the jumper connection configuration of any channel as desired, under control of inputs supplied via personal computer 130.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. A circuit device for simulating a selected one of a plurality of process transducers, comprising:
   means defining signal input and output terminals connectable to external conductors;
   means defining a plurality of circuit components connectable between said signal input and output terminals;
   coupling means connected between two of said circuit components for conducting a signal between said two components;
   selective connecting means including connector terminals connected to at least one of said circuit components, and connector elements for establishing conductive connections between selected ones of said connector terminals for configuring said circuit device to apply to said signal output terminal a signal corresponding to the output signal of a selected transducer;
   wherein said circuit components include:
      a differential amplifier having a first input connected to said signal input terminal, a second input and an output; and
      voltage/current converting means having an input for receiving a voltage and an output for supplying a current proportional to the voltage applied to the input; and
      said coupling means are connected between said amplifier output and said converting means input for applying to said converting means input a voltage corresponding to the voltage at said amplifier output.

2. A circuit device as defined in claim 1 wherein said coupling means comprises an optical coupler.

3. A circuit device as defined in claim 2 wherein said selective connecting means are arranged to permit said components to be connected in either one of a first or second configuration, the first configuration being one in which said amplifier output is connected to said output terminal to simulate a voltage signal generator, and the second configuration being one in which said converting means output is connected to said signal output terminal and said differential amplifier second input to simulate a current transmitter.

4. A circuit device as defined in claim 1 wherein said connector terminals are arranged in sets, each set including at least two terminals, and each said connector element constitutes means for establishing a short circuit among all terminals of a selected set.

5. A circuit device as defined in claim 4 wherein each said connector element comprises a shorting bar.

6. A circuit device as defined in claim 4 wherein each said connector element comprises a relay.

7. A circuit device for simulating a selected one of a plurality of resistance temperature detectors, comprising:
   means defining signal input and output terminals connectable to external conductors;
   means defining a plurality of circuit components connectable between said signal input and output terminals;
   coupling means connected between two of said circuit components for conducting a signal between said two components;
   selective connecting means including connector terminals connected to at least one of said circuit components, and connector elements for establishing conductive connections between selected ones of said connector terminals for configuring said circuit device to apply to said signal output terminal a signal corresponding to the output signal of a selected transducer;
   wherein said circuit components comprise:
      amplifying means connected to produce a first signal representative of the current through a selected resistance temperature detector;
      means supplying a second signal representative of a temperature to be simulated; and
      signal combining means connected to produce, and apply to said signal output terminal, a signal proportional to the product of the first and second signal.

8. A device as defined in claim 7 wherein said connecting means are connected to said amplifying means for configuring said amplifying means to simulate a given nominal resistance value and a given temperature-resistance characteristic.

9. A device as defined in claim 1 further comprising means defining a test output terminal for providing a test voltage representative of the signal at said signal output terminal.

10. A circuit device as defined in claim 7 wherein said connector terminals are arranged in sets, each set including at least two terminals, and each said connector element constitutes means for establishing a short circuit among all terminals of a selected set.

11. A circuit device as defined in claim 10 wherein each said connector element comprises a shorting bar.

12. A circuit device as defined in claim 10 wherein each said connector element comprises a relay.

13. A testing system comprising: a plurality of circuit devices, each device for simulating a selected one of a plurality of process transducers, each device comprising:
   means defining signal input and output terminals connectable to external conductors;
   means defining a plurality of circuit components connectable between said signal input and output terminals;
   coupling means connected between two of said circuit components for conducting a signal between said two components; and
   selective connecting means including connector terminals connected to at least one of said circuit components, and connector elements for establishing conductive connections between selected ones of said connector terminals for configuring said circuit device to apply to said signal output terminal a signal corresponding to the output signal of a selected transducer;
   said system further comprising: a circuit board carrying all of said connector elements; control means connected for controlling the conductive connections established by said connector elements between selected ones of said connector terminals; and personal computer means connected to said signal input terminals of all of said devices for supplying input signals thereto and to said control means for supplying control signals designating the conductive connections which are to be established by said control means.

14. A testing system as defined in claim 13 further comprising output selecting means connected to said output terminals of all of said devices for connecting a selected output terminal to apparatus to be tested.

15. A testing system as defined in claim 14 wherein said output selecting means are connected to be controlled by said control means.

16. A circuit device as defined in claim 13 wherein said connector terminals are arranged in sets, each set including at least two terminals, and each said connector element constitutes means for establishing a short circuit among all terminals of a selected set.

17. A circuit device as defined in claim 16 wherein each said connector element comprises a shorting bar.

18. A circuit device as defined in claim 16 wherein each said connector element comprises a relay.

* * * * *